(12) United States Patent
Takagi et al.

(10) Patent No.: US 11,225,562 B2
(45) Date of Patent: Jan. 18, 2022

(54) EXPANDED BEADS AND MOLDED OBJECT THEREOF

(71) Applicant: JSP Corporation, Tokyo (JP)

(72) Inventors: Shota Takagi, Yokkaichi (JP); Masaharu Oikawa, Tokyo (JP)

(73) Assignee: JSP Corporation, Tokyo (JP)

( * ) Notice: Subject to any disclaimer, the term of this patent is extended or adjusted under 35 U.S.C. 154(b) by 0 days.

(21) Appl. No.: 16/333,479

(22) PCT Filed: Sep. 15, 2017

(86) PCT No.: PCT/JP2017/033501
§ 371 (c)(1),
(2) Date: Mar. 14, 2019

(87) PCT Pub. No.: WO2018/052125
PCT Pub. Date: Mar. 22, 2018

(65) Prior Publication Data
US 2019/0263993 A1     Aug. 29, 2019

(30) Foreign Application Priority Data

Sep. 16, 2016   (KE) .......................... JP2016-181614

(51) Int. Cl.
| C08J 9/18 | (2006.01) |
| B29C 44/34 | (2006.01) |
| B29C 44/44 | (2006.01) |
| B29K 23/00 | (2006.01) |
| C08K 5/00 | (2006.01) |

(52) U.S. Cl.
CPC .............. *C08J 9/18* (2013.01); *B29C 44/3461* (2013.01); *B29C 44/445* (2013.01); *B29K 2023/08* (2013.01); *C08J 2205/044* (2013.01); *C08J 2323/08* (2013.01); *C08J 2323/18* (2013.01); *C08K 5/0016* (2013.01); *C08K 5/0025* (2013.01); *C08K 5/0083* (2013.01)

(58) Field of Classification Search
CPC ...... B29C 44/3461; B29C 44/445; C08J 9/16; C08J 9/18; C08J 9/232; C08J 2201/026; C08J 2201/034; C08J 2205/044; C08J 2323/08; C08J 2323/18; C08J 2353/00; B29K 2023/08; C08K 5/0016; C08K 5/0025; C08K 5/0083
See application file for complete search history.

(56) References Cited

U.S. PATENT DOCUMENTS

| 4,366,263 | A | * | 12/1982 | Sato ................... B29C 67/205 264/53 |
| 4,379,859 | A | * | 4/1983 | Hirosawa ............ C08J 9/0061 521/59 |
| 4,464,484 | A | * | 8/1984 | Yoshimura ......... B29C 44/3461 264/50 |
| 5,071,883 | A |  | 12/1991 | Kuwabara et al. |
| 9,449,735 | B2 |  | 9/2016 | Chiba et al. |
| 10,435,530 | B2 |  | 10/2019 | Takagi et al. |
| 10,787,555 | B2 |  | 9/2020 | Takagi et al. |
| 2002/0143077 | A1 |  | 10/2002 | Sueda et al. |
| 2008/0194573 | A1 |  | 8/2008 | Feuerbach et al. |
| 2009/0029143 | A1 |  | 1/2009 | Kanae et al. |
| 2010/0022674 | A1 |  | 1/2010 | Morioka et al. |
| 2014/0097389 | A1 |  | 4/2014 | Chiba et al. |
| 2016/0009888 | A1 |  | 1/2016 | Oikawa et al. |
| 2019/0263993 | A1 |  | 8/2019 | Takagi et al. |
| 2020/0032024 | A1 |  | 1/2020 | Takagi et al. |

FOREIGN PATENT DOCUMENTS

| CN | 1369520 A | 9/2002 |
| CN | 1252171 C | 4/2006 |
| CN | 1939959 A | 4/2007 |
| CN | 101155864 A | 4/2008 |
| CN | 101528827 A | 9/2009 |
| CN | 103724653 A | 4/2014 |
| EP | 1861454 A1 | 12/2007 |
| JP | S51-124157 A | 10/1976 |
| JP | H03-2230 A | 1/1991 |
| JP | H05-009329 A | 1/1993 |
| JP | 2000-154270 A | 6/2000 |
| JP | 2001-164021 A | 6/2001 |
| JP | 2003-147116 A | 5/2003 |
| JP | 2003-206364 A | 7/2003 |
| JP | 2004-027124 A | 1/2004 |
| JP | 2005-023302 A | 1/2005 |
| JP | 2005-060566 A | 3/2005 |

(Continued)

OTHER PUBLICATIONS

International Search Report for PCT/JP2017/033501 dated Dec. 19, 2017 and English Translation submitted herewith (5 pages).
Office Action dated Jun. 23, 2020, in corresponding Japanese Patent Application No. 2016-181614 (2 pages).
The Dow Chemical Company, INFUSE 9530 Olefin Block Copolymer Safety Data Sheet, Aug. 2018 (10 pages).
The Dow Chemical Company, INFUSE 9530 Olefin Block Copolymer Technical Information, Sep. 2011 (2 pages).

*Primary Examiner* — Irina S Zemel

(74) *Attorney, Agent, or Firm* — Fitch, Even, Tabin & Flannery LLP

(57) ABSTRACT

The present invention provides expanded beads comprising a crosslinked multi-block copolymer containing an ethylene block and an ethylene-α-olefin copolymer block, having an apparent density of 40 to 300 g/L, a gel fraction of 30 to 70% by weight by a hot xylene extraction method, an average cell diameter (a) of 50 to 180 μm, and an average surface layer thickness (b) of 3 to 27 μm, and the expanded beads are excellent in in-mold moldability, and can produce an expanded beads molded article being excellent in tensile characteristics in a well balanced manner.

6 Claims, No Drawings

(56) References Cited

FOREIGN PATENT DOCUMENTS

| | | | |
|---|---|---|---|
| JP | 2006-022138 A | 1/2006 | |
| JP | 2006-232939 A | 9/2006 | |
| JP | 2007-169527 A | 7/2007 | |
| JP | 2008-533289 A | 8/2008 | |
| JP | 2008-266589 A | 11/2008 | |
| JP | 2010-222546 A | 10/2010 | |
| JP | 1669301 B2 | 4/2011 | |
| JP | 2011-132356 A | 7/2011 | |
| JP | 2011-184574 A | 9/2011 | |
| JP | 2012-201820 A | 10/2012 | |
| JP | 5122951 B2 | 1/2013 | |
| JP | 2013-064137 A | 4/2013 | |
| JP | 2013-100555 A | 5/2013 | |
| JP | 5254103 B2 | 8/2013 | |
| JP | 2014-077045 A | 5/2014 | |
| JP | 2014-173012 A | 9/2014 | |
| JP | 2015-108033 A | 6/2015 | |
| JP | 2016-222807 A | 12/2016 | |
| JP | 2017/033501 A1 | 12/2017 | |
| WO | WO-2006099631 A1 * | 9/2006 | .......... C08L 23/0815 |
| WO | 2013/132957 A1 | 9/2013 | |
| WO | 2016/136875 A1 | 9/2016 | |
| WO | 2016/181714 A1 | 11/2016 | |

* cited by examiner

EXPANDED BEADS AND MOLDED OBJECT THEREOF

CROSS-REFERENCE TO RELATED APPLICATIONS

This application is a U.S. national phase application filed under 35 U.S.C. § 371 of International Application PCT/JP2017/033501, filed Sep. 15, 2017, designating the United States, which claims priority from Japanese Application Number 2016-181614, filed Sep. 16, 2016.

FIELD OF THE INVENTION

The present invention relates to expanded beads composed of a crosslinked a multi-block copolymer containing a polyethylene block and an ethylene-α-olefin copolymer block, and an expanded beads molded article thereof.

BACKGROUND OF THE INVENTION

Expanded polyolefin-based resin beads can be molded into various shapes depending on purposes thereof. An expanded polyolefin-based resin beads molded article obtained from the expanded beads through in-mold molding is applied to a wide range of purposes including various kinds of a packaging and cushioning material, a shock absorber for automobiles, a building material, and the like. However, in the case where the known polyolefin-based resin expanded beads molded article is applied to purposes including a seat cushioning material, a pad material for sporting, a shoe sole material, and the like, the polyolefin-based resin expanded beads molded article may be insufficient in repulsion, flexibility, and restorability, in some cases. In the case where the polyolefin-based resin expanded beads molded article is applied to purposes including a seat cushioning material, a pad material for sporting, a shoe sole material, and the like, furthermore, the molded article is preferably improved in tensile characteristics.

For example, as an expanded article having flexibility, PTL 1 describes expanded polyolefin-based resin beads composed of a polyolefin-based resin, a thermoplastic elastomer, and a mineral oil. PTL 2 describes an expanded article composed of an ethylene-α-olefin multi-block copolymer.

CITATION LIST

Patent Literatures

PTL 1: JP 2011-132356 A
PTL 2: JP 2013-64137 A

SUMMARY OF INVENTION

However, an expanded beads molded article produced with the expanded beads described in PTL 1 is necessarily further enhanced in flexibility, tensile characteristics, and restorability although the expanded beads molded article is excellent in lightweight property.

PTL 2 describes an expanded article composed of an ethylene-α-olefin multi-block copolymer, but PTL 2 does not sufficiently investigate about an expanded beads molded article obtained through in-mold molding of expanded beads. In particular, the related art has need of consideration remaining in providing expanded beads excellent in in-mold moldability and an expanded beads molded article excellent in tensile characteristics.

In view of the aforementioned circumstances, an article of the present invention is to provide expanded beads excellent in in-mold moldability and an expanded beads molded article excellent in tensile characteristics. The present inventors have found that the problems can be solved by employing the constitutions shown below, and thus the present invention has been completed.

Specifically, the present invention relates to the following.

[1] Expanded beads comprising a crosslinked multi-block copolymer containing a polyethylene block and an ethylene-α-olefin copolymer block, wherein the expanded beads have an apparent density of 40 to 300 g/L, a gel fraction of 30 to 70% by weight by a hot xylene extraction method, an average cell diameter (a) of 50 to 180 μm, and an average surface layer thickness (b) of 3 to 27 μM.

[2] The expanded beads according to the item [1], wherein a ratio (a/b) of the average cell diameter (a) to the average surface layer thickness (b) is from 5 to 12.

[3] The expanded beads according to the item [1] or [2], wherein the multi-block copolymer is a multi-block copolymer containing a polyethylene block and an ethylene-octene copolymer block.

[4] The expanded beads according to any one of the items [1] to [3], wherein a ratio (c/b) of an average cell membrane thickness (c) of the expanded beads to the average surface layer thickness (b) is from 0.3 to 8.

[5] An expanded beads molded article, which is produced through in-mold molding of the expanded beads according to any one of the items [1] to [4], and has a tensile elongation of 140% or more.

DESCRIPTION OF EMBODIMENTS

[Expanded Beads]

The expanded beads of the present invention comprising a crosslinked polymer obtained by crosslinking a multi-block copolymer containing a polyethylene block and an ethylene-α-olefin copolymer block (in the following description, the crosslinked polymer obtained by crosslinking a multi-block copolymer containing a polyethylene block and an ethylene-α-olefin copolymer block may be referred simply to as a crosslinked multi-block copolymer).

The expanded beads composed of a crosslinked polymer obtained by crosslinking a multi-block copolymer containing a polyethylene block and an ethylene-α-olefin copolymer block (which may be hereinafter referred simply to as crosslinked expanded beads or expanded beads) of the present invention will be described in detail below.

(Average Cell Diameter of Expanded Beads)

The expanded beads of the present invention have an average cell diameter (a) of 50 to 180 μm. In the case where the average cell diameter (a) is less than 50 μm, the cells of the expanded beads tend to be broken by the heat in in-mold molding, and thereby the closed cell ratio of the expanded beads may be decreased to lower the secondary expandability thereof. In molding, furthermore, the restorability of the resulting molded article may be decreased. In the case where the average cell diameter (a) exceeds 180 μm, on the other hand, the physical properties of the molded article and the repulsion of the molded article may be decreased. Furthermore, a large amount of heat may be necessary for fusion bonding the surfaces of the expanded beads in heat molding, resulting in decrease of the fusion bondability of the molded article. From the standpoints, the lower limit of the average cell diameter (a) is more preferably 60 µm, further preferably 70 µm, and most preferably 80 µm. The upper limit of the average cell diameter (a) is more preferably 170 µm, further preferably 160 µm, and most preferably 140 µm.

(Measurement of Average Cell Diameter of Expanded Beads)

In the present invention the average cell diameter of the expanded beads is measured in the following manner according to ASTM D3576-77.

A cross sectional surface obtained by cutting the expanded bead into substantially equal halves is photographed with a scanning electron microscope. On the resulting cross sectional micrograph, straight lines are drawn from the approximately center of the cross sectional surface of the expanded bead toward eight directions at regular intervals, and the number of cells intersecting the straight lines is counted. A value obtained by dividing the total length of the straight lines by the number of the counted cells is designated as an average chord length. The cell diameter of the expanded bead is calculated by dividing the average chord length by 0.616. The operation is performed for 30 or more expanded beads, and the arithmetic average value of the cell diameters of the expanded beads is designated as the average cell diameter.

In the measurement of the cell diameter of the expanded beads, a cell that intersects the straight line at least a part of the cell is counted. In the measurement, the reason why the straight lines are drawn from the approximately center of the cross sectional surface of the expanded bead toward eight directions at regular intervals is that assuming that the straight lines are drawn from the approximately center of the cross sectional surface of the expanded bead toward eight directions at regular intervals, the value of the cell diameter can be stably obtained with less fluctuation even though the shapes of the cells measured are different from each other among the directions on the cross sectional surface of the expanded bead.

(Average Surface Layer Thickness (b) of Expanded Beads and Measurement Thereof)

The expanded beads of the present invention have an average surface layer thickness (b) of 3 to 27 µm. In the case where the average surface layer thickness is less than 3 µm, the surface layer portion of the expanded beads may be softened in heat molding to make the cells on the surface of the expanded beads breakable, and thereby a favorable expanded beads molded article may not be obtained. On the other hand, in the case where the average surface layer thickness exceeds 27 µm, due to the necessity of a large amount of heat in heat molding, it may be difficult to fusion bond the expanded beads to each other to prevent the expanded beads from being firmly fusion bonded to each other. Accordingly, in the comparison among expanded beads molded articles having the same density, the expanded beads molded article that has a too large value of the average surface layer thickness may relatively have deteriorated tensile characteristics. From the standpoints, the lower limit of the average surface layer thickness (b) is preferably 4 µm, and more preferably 5 µm. The upper limit of the average surface layer thickness (b) is preferably 25 µm, and more preferably 23 µm.

In the present invention, the average surface layer thickness (b) of the expanded beads is measured in the following manner.

A cross sectional surface obtained by cutting the expanded bead into substantially equal halves is photographed with a scanning electron microscope at a magnification of 300. In the surface layer portion of the expanded bead on the resulting cross sectional micrograph, cells that are positioned outermost the expanded bead and are connected in the circumferential direction of the expanded bead are selected at least 10 positions, the minimum values of the cell membrane thickness of the cells on the side of the surface of the expanded bead are measured, and the arithmetic average value of the values is designated as the surface layer thickness of the expanded bead. The operation is performed for 30 or more expanded beads, and the arithmetic average value of the surface layer thicknesses is designated as the average surface layer thickness.

(Ratio (a/b) of Average Cell Diameter (a) to Average Surface Layer Thickness (b) of Expanded Beads)

The expanded beads of the present invention preferably have a ratio (a/b) of the average cell diameter (a) to the average surface layer thickness (b) of 5 to 12. In the case where the ratio (a/b) is in a range of 5 to 12, the expanded beads may be excellent in balance between the cell diameter and the surface layer thickness, and thus the expanded beads may be excellent in secondary expandability and fusion bondability. Furthermore, an expanded beads molded article obtained from the expanded beads may be excellent in tensile strength. From the standpoints, the lower limit of the ratio is more preferably 6, further preferably 7, and most preferably 8. The upper limit of the ratio is more preferably 11, and further preferably 10.

(Average Cell Membrane Thickness of Expanded Beads)

The average cell membrane thickness (Tm) of the expanded beads is calculated from the average cell diameter a measured by the aforementioned method, according to the following expression (1).

$$V_s = (\rho f - \rho g)/(\rho s - \mu g) = [(a+Tm)^3 - a^3]/(a+Tm)^3 \quad (1)$$

In the expression, $V_s$ represents the volume fraction of the base resin; $\rho f$ represents the apparent density (g/cm$^3$) of the expanded beads; $\mu s$ represents the density (g/cm$^3$) of the base resin; $\mu g$ represents the gas density (g/cm$^3$) in the cells; a represents the average cell diameter (µm); and Tm represents the average cell membrane thickness (µm). In the expression (1), assuming that $\mu g$ is 0 (g/cm$^3$) since ($\mu f$ and $\mu s$)>>$\mu g$, the expression is $V_s = \mu f / \mu s$. Accordingly, the average cell membrane thickness Tm (µm) can be calculated by the expression Tm=a[(X/(X−1))$^{1/3}$−1] (wherein X=µs/µf). When the average cell diameter a of the expanded beads is determined, the average cell membrane thickness (Tm) of the expanded beads can be determined by the expression.

The expression (1) is the relational expression between the average cell diameter and the average cell membrane thickness assuming that the cells have a spherical shape, and is described in "Plastic Foam Handbook" (published by Nikkan Kogyo Shimbun, Ltd., February 28, Showa 48 (1973), Section 1.3.2, p. 222.

The lower limit of the ratio (c/b) of the average cell membrane thickness Tm (c) to the average surface layer thickness (b) of the expanded beads of the present invention is preferably 0.3, more preferably 0.35, and further preferably 0.4. The upper limit of the ratio (c/b) is preferably 0.8, more preferably 0.7, and further preferably 0.6. In the case where the ratio is in the range, the expanded beads may be excellent in balance between the cell membrane thickness and the surface layer thickness, and thus the expanded beads may be excellent in secondary expandability and fusion bondability. Furthermore, an expanded beads molded article obtained from the expanded beads may be excellent in tensile strength.

(Apparent Density of Expanded Beads)

The expanded beads of the present invention have an apparent density of 40 to 300 g/L. In the case where the apparent density of the expanded beads is in the range, an expanded beads molded article obtained through in-mold molding of the expanded beads is excellent in lightweight property, flexibility, and repulsion. From the standpoint, the lower limit of the apparent density of the expanded beads is preferably 50 g/L, more preferably 60 g/L, and further preferably 80 g/L. The upper limit of the apparent density of the expanded beads is preferably 250 g/L, more preferably 200 g/L, further preferably 180 g/L, and most preferably 150 g/L.

(Average Bead Diameter of Expanded Beads)

The lower limit of the average bead diameter of the expanded beads of the present invention is preferably 0.5 mm, more preferably 1 mm, and further preferably 2 mm. The upper limit of the average bead diameter thereof is preferably 10 mm, more preferably 8 mm, and further preferably 5 mm. In the case where the average bead diameter of the expanded beads is in the range, the expanded beads can be readily produced, and the filling property of the expanded beads in a mold may be enhanced in in-mold molding thereof. The average bead diameter of the expanded beads can be controlled, for example, by controlling the amount of a blowing agent, the expanding condition, the particle diameter of polymer particles, and the like.

The average bead diameter of the expanded beads and the apparent density of the expanded beads can be measured in the following manner. A group of the expanded beads is allowed to stand under condition of a relative humidity of 50%, a temperature of 23° C., and 1 atm for 2 days. Subsequently, a measuring cylinder having water at 23° C. placed therein is prepared, and an arbitrary amount of the group of the expanded beads having been allowed to stand for 2 days (weight of the group of the expanded beads: W1) is immersed in water in the measuring cylinder with a device, such as a metallic mesh. The volume V1 (L) of the group of the expanded beads is measured by reading the elevation of the water level taking the volume of the device, such as a metallic mesh, into consideration. The volume V1 is divided by the number (N) of the expanded beads having been placed in the measuring cylinder (V1/N), so as to calculate the average volume per one of the expanded beads. The diameter of the virtual true sphere that has the same volume as the resulting average volume is designated as the average bead diameter (mm) of the expanded beads. The apparent density of the expanded beads can be obtained by dividing the weight W1 (g) of the group of the expanded beads having been placed in the measuring cylinder by the volume V1 (W1/V1).

(Gel Fraction of Expanded Beads by Hot Xylene Extraction Method)

In the present invention, the expanded beads have a gel fraction of 30 to 70% by weight by a hot xylene extraction method. In the case where the gel fraction is too small, an expanded beads molded article obtained through in-mold molding of the expanded beads may have deteriorated molding restorability (shape recovering property), and the target physical properties may not be obtained in some cases. In the case where the gel fraction is too large, the expanded beads may have low fusion bondability to each other, and it may be difficult to produce an expanded beads molded article in some cases. From the standpoints, the lower limit of the gel fraction of the expanded beads is preferably 35% by weight, and more preferably 40% by weight. The upper limit of the gel fraction of the expanded beads is preferably 60% by weight, and more preferably 55% by weight.

In the present invention, the gel fraction is one of the indices showing the state of crosslinking of the crosslinked multi-block copolymer constituting the expanded beads, and can be measured in the following manner.

The gel fraction can be controlled by the amount of the crosslinking agent described later added, and also can be controlled by the agitation condition, the temperature rise condition, and the like in the crosslinking of the polymer particles in a closed vessel.

The gel fraction by a hot xylene extraction method can be measured in the following manner. Approximately 0.7 g of the expanded beads is weighed, and is designated as a specimen weight W1. The weighed expanded beads are placed in a 150 mL round-bottom flask, and 100 mL of xylene is placed in the round-bottom flask and refluxed under heating with a mantle heater for 6 hours. Thereafter, the residue remaining after dissolution in the round-bottom flask is separated by filtering with a 100-mesh metal mesh, and the separated product is dried in a vacuum dryer at 80° C. for 8 hours or more. The weight W2 of the resulting dried product is measured. The weight percentage of the weight W2 to the specimen weight W1 ((W2/W1)×100) (%) is calculated and designated as the gel fraction.

(Multi-Block Copolymer)

The multi-block copolymer used in the present invention contains a polyethylene block and an ethylene-α-olefin copolymer block. The multi-block copolymer can be shown, for example, by the following formula (2):

$$(AB)_n \quad (2)$$

wherein n represents an integer of 1 or more, A represents a hard block, and B represents a soft block.

Herein, the hard block A (which may be hereinafter referred to as a block A) corresponds to the polyethylene block, and the soft block B (which may be hereinafter referred to as a block B) corresponds to the ethylene-α-olefin copolymer block. The block A and the block B are preferably arranged in a linear state. The multi-block copolymer preferably does not contain a third block other than the block A and the block B.

The proportion of the constitutional unit derived from ethylene in the polyethylene block constituting the block A is preferably more than 95% by weight, and more preferably more than 98% by weight, with respect to the weight of the polyethylene block. In the ethylene-α-olefin copolymer block constituting the block B, the proportion of the constitutional unit derived from the α-olefin is preferably more than 5% by weight, more preferably more than 10% by weight, and further preferably more than 15% by weight, with respect to the weight of the ethylene-α-olefin copolymer block.

The proportion of the ethylene-α-olefin copolymer block constituting the block B in the multi-block copolymer is preferably from 1 to 99% by weight, and more preferably from 5 to 95% by weight, with respect to the weight of the multi-block copolymer. The proportion of the polyethylene block and the proportion of the ethylene-α-olefin copolymer block can be calculated based on data obtained by differential scanning calorimetry (DSC) or nuclear magnetic resonance (NMR).

The ethylene-α-olefin copolymer block constituting the block B in the multi-block copolymer is preferably a block of a copolymer of at least one of a $C_3$ to $C_{20}$ α-olefin and ethylene. Examples of the α-olefin copolymerized with ethylene in the ethylene-α-olefin copolymer block include propylene, 1-butene, 1-pentene, 1-hexene, 1-heptene, 1-octene, 1-nonene, 1-decene, 3-methyl-1-butene, and 4-methyl-1-pentene, which may be used in combination. From the standpoint of the industrial availability, the characteristics, and the economic efficiency, examples of the α-olefin copolymerized with ethylene include propylene, 1-butene, 1-hexene, and 1-octene, and 1-octene is particularly preferred.

Examples of the multi-block copolymer include the ethylene-α-olefin copolymer described in PTL 2. Examples of the commercially available products of the multi-block copolymer include "Infuse", a trade name, produced by The Dow Chemical Company.

The ethylene-α-olefin copolymer can be produced by using a known polymerization method using a known olefin polymerization catalyst. Examples of the production method of the ethylene-α-olefin copolymer include a slurry polymerization method, a solution polymerization method, and a gas phase polymerization method using a multisite catalyst represented by a Ziegler-Natta catalyst, and a single site catalyst represented by a metallocene catalyst and a post-metallocene catalyst, and a bulk polymerization method using a radical initiator.

The melt flow rate at 190° C. and a load of 2.16 kg of the multi-block copolymer may be preferably selected from a range of 2 to 10 g/10 min. In the case where the melt flow rate is in the range, the expanded beads of the multi-block copolymer may have good fusion bondability, an expanded beads molded article can be readily produced through in-mold molding of the expanded beads, and the expanded beads molded article may be excellent in restorability. The melt flow rate herein is a value for the multi-block copolymer before the crosslinking step described later that is measured under condition of a temperature of 190° C. and a load of 2.16 kg according to JIS K7210-1:2014.

The lower limit of the melt flow rate is preferably 3 g/10 min, and more preferably 4 g/10 min. The upper limit of the melt flow rate is preferably 8 g/10 min, and more preferably 7 g/10 min.

The lower limit of the density of the multi-block copolymer is preferably 700 g/L, and more preferably 800 g/L. The upper limit of the density of the multi-block copolymer is preferably 1,000 g/L, and more preferably 900 g/L.

The lower limit of the melting point of the multi-block copolymer is preferably 110° C., and more preferably 115° C. The upper limit of the melting point of the multi-block copolymer is preferably 150° C., and more preferably 140° C. In the case where the melting point of the multi-block copolymer is in the range, the compression set at a high temperature can be made small. The melting point of the multi-block copolymer can be obtained by the heat flux differential scanning calorimetry described in JIS K7121 (1987) in such a manner that the multi-block copolymer is heated from 30° C. to 200° C. at a temperature rise rate of 10° C./min, then cooled to 30° C. at a cooling rate of 10° C./min, and then again heated from 30° C. to 200° C. at a temperature rise rate of 10° C./min to provide a DSC curve, and the melting point is obtained from the peak temperature of the endothermic peak determined by the DSC curve. In the case where plural endothermic peaks appear in the DSC curve for the second heating, the peak temperature of the endothermic peak having the maximum area is designated as the melting point.

The lower limit of the flexural modulus of the multi-block copolymer is preferably 10 MPa, more preferably 12 MPa, further preferably 15 MPa, and most preferably 20 MPa. The upper limit of the flexural modulus of the multi-block copolymer is preferably 100 MPa, more preferably 50 MPa, further preferably 40 MPa, most preferably 35 MPa, and further most preferably 30 MPa. The flexural modulus of the multi-block copolymer is a value that is measured by the measurement method described in JIS K7171:2008.

Particles of the multi-block copolymer (which may be hereinafter referred to as polymer particles) may contain an additional polymer other than the multi-block copolymer in such a range that does not impair the articles and effects of the present invention. Examples of the additional polymer other than the multi-block copolymer include a thermoplastic resin, such as a polyolefin-based resin (for example, a polyethylene-based resin, a polypropylene-based resin, and a polybutene-based resin) and a polystyrene-based resin, a thermoplastic elastomer (for example, polybutadiene, polyisoprene, an ethylene-propylene copolymer, an ethylene-propylene-diene copolymer, and styrene-butadiene, styrene-isoprene, styrene-butadiene-styrene, and styrene-isoprene-styrene block copolymers and hydrogenated products thereof), and a dynamically crosslinked elastomer (such as ethylene-propylene rubber (EPM) and an ethylene-propylene-diene terpolymer (EPDM)). The proportion of the additional polymer mixed is preferably 10 parts by weight or less, and more preferably 5 parts by weight or less, per 100 parts by weight of the multi-block copolymer, and the multi-block copolymer particle particularly preferably contains only the multi-block copolymer.

[Production Method of Expanded Beads]

For the expanded beads of the present invention, non-expanded particles are firstly produced through the process of producing multi-block copolymer particles as shown in the following process (A), or the like. Subsequently, the non-expanded particles are subjected to the process (B) including crosslinking, impregnation of a blowing agent, and expanding, so as to produce the expanded beads.

(Process (A): Kneading and Granulating Process)

Non-expanded polymer particles are produced by a known granulating method, such as a method, in which the multi-block copolymer is fed to an extruder and kneaded to form a molten kneaded material, the molten kneaded material is extruded from the extruder into a strand form, and the strand is cut into a size suitable for forming the expanded beads. For example, the molten kneaded material having been extrusion-molded into a strand form in the aforementioned method is cooled with water, and then cut into a prescribed length, so as to provide the polymer particles of the multi-block copolymer. For cutting into a prescribed length, for example, a strand cutting method may be employed. In alternative, the particles of the multi-block copolymer can be obtained by a hot cutting method, in which the molten kneaded material is cut immediately after extruding, an underwater cutting method, in which the molten kneaded material is cut in water, and the like.

The average weight per one of the polymer particles is generally preferably from 0.1 to 20 mg, and more preferably from 0.2 to 10 mg. In the case where the average weight is in the range, the polymer particles may have a small size with an increased surface area of the particles, thereby preventing the increase of the dissipation rate of the blowing agent in expanding the polymer particles, and preventing the deterioration of the in-mold moldability of the expanded beads. Furthermore, such a phenomenon may be prevented that in crosslinking the polymer particles, the polymer particles are not crosslinked uniformly through the center thereof due to the too large size of the polymer particles, whereby the interior of the expanded beads is converted to open cells, and the expanded beads clog the piping in molding. Consequently, a favorable expanded beads molded article can be obtained.

The average weight of the polymer particles is a value obtained by dividing the weight (mg) of randomly selected 100 polymer particles by 100.

The polymer particles may contain known additives, such as a flame retardant, a flame retarding assistant, a plasticizer, an antistatic agent, an antioxidant, an ultraviolet ray absorbent, a light stabilizer, a conductive filler, and an antibacterial agent. The additives may be added in the process of providing the polymer particles in kneading in the process (A).

The polymer particles may contain a cell controlling agent (which is also referred to as a "foam nucleating agent" or a "nucleating agent"). Examples of the cell controlling agent include an inorganic material, such as talc, mica, zinc borate, calcium carbonate, silica, titanium oxide, gypsum, zeolite, borax, aluminum hydroxide, and carbon, and an organic nucleating agent, such as a phosphoric acid-based nucleating agent, a phenol-based nucleating agent, an amine-based nucleating agent, and polyethylene fluoride resin powder, such as polytetrafluoroethylene (PTFE). The cell controlling agent may be contained in the polymer particles by feeding to the extruder in the process of obtaining the polymer particles. The proportion of the cell controlling agent in the polymer particles is preferably from 0.01 to 1 part by weight per 100 parts by weight of the multi-block copolymer.

The cell controlling agent preferably has an average particle diameter of from 0.01 to 50 µm, and more preferably from 0.1 to 30 µm. The average particle diameter of the cell controlling agent may be measured by the centrifugal sedimentation particle size measuring method.

The expanded beads of the present invention that have the target average cell diameter and the target average surface layer thickness can be obtained by changing the expanding conditions, such as the kind and the amount of the cell controlling agent added, the expanding method, the expanding temperature, the amount of the blowing agent, and the expanding atmosphere, and the characteristics of the resin. For example, in the case where the amount of the cell controlling agent (foam nucleating agent) added is increased, there is a tendency that the cells become small and the cell membrane thickness becomes thin since the amount of the foam nuclei is increased. The cell controlling agent containing a hydrate, such as zinc borate, may have a tendency of increasing the cell diameter since hydrated water acts on the expansion. The target expanded beads can be thus obtained in this manner.

(Process (B): Crosslinking of Polymer Particles, Impregnation with Blowing Agent, and Expansion Process)

In the process (B), the polymer particles obtained through the process (A) or the like are dispersed in a dispersing medium, such as water, along with a crosslinking agent in a closed vessel, and heated under agitation to soften and crosslink the polymer particles, and to impregnate the polymer particles with a blowing agent. Thereafter, the expandable particles impregnated with the blowing agent are expanded to provide the expanded beads.

(Dispersing Medium)

The dispersing medium used in the production of the expanded beads of the present invention is not particularly limited, as far as the dispersing medium does not dissolve the polymer particles. Examples of the dispersing medium include water, ethylene glycol, glycerin, methanol, and ethanol. The dispersing medium is preferably water.

(Dispersion)

The polymer particles are dispersed in the dispersing medium. For example, the polymer particles may be dispersed in the dispersing medium by using an agitator.

In the process (B), a dispersant may be further added to the dispersing medium. Examples of the dispersant include an organic dispersant, such as polyvinyl alcohol, polyvinylpyrrolidone, and methyl cellulose, and a sparingly soluble inorganic salt, such as aluminum oxide, zinc oxide, kaolin, mica, magnesium phosphate, and tricalcium phosphate. A surfactant may be further added to the dispersing medium. Examples of the surfactant include sodium oleate and sodium dodecylbenzenesulfonate, and also include an anionic surfactant, a nonionic surfactant, and the like that are generally used in suspension polymerization.

(Closed Vessel)

The closed vessel used in the process (B) is not particularly limited, as far as the vessel can be closed air-tightly. In the process (B), the copolymer particles are heated to increase the pressure inside the closed vessel, and therefore the closed vessel necessarily withstands the pressure increase in the process (B). The closed vessel may be, for example, an autoclave.

(Crosslinking Agent and Crosslinking)

In the process (B), a crosslinking agent may be used for crosslinking the multi-block copolymer constituting the polymer particles. The crosslinking agent may be added to the dispersing medium in advance, and may be added to the dispersing medium after dispersing the polymer particles therein. The crosslinking agent is not particularly limited, as far as the crosslinking agent can crosslink the multi-block copolymer. The crosslinking agent used may be a known organic peroxide used for crosslinking a polyethylene-based resin. Examples thereof include the Percumyl series compound, such as dicumyl peroxide and tert-butylcumyl peroxide, the Perbutyl series compound, such as 1,1-bis(tert-butylperoxy)-3,3,5-trimethylcyclohexane, 2,5-dimethyl-2,5-di(tert-butylperoxy)hexane, and di-tert-butyl peroxide, the Perhexyl series compound, such as tert-hexyl peroxybenzoate, and the Perocta series compound, such as 1,1,3,3-tetramethylbutyl peroxy-2-ethylhexanoate. Among these, the Percumyl series compound and the Perbutyl series compound are preferred, and dicumyl peroxide is more preferred. These compounds may be used alone or as a combination of two or more kinds thereof. The lower limit of the amount of the crosslinking agent mixed is preferably 0.1 part by weight, and more preferably 0.2 part by weight, per 100 parts by weight of the multi-block copolymer. The upper limit of the amount of the crosslinking agent mixed is preferably 5.0 part by weight, and more preferably 2.5 part by weight, per 100 parts by weight of the multi-block copolymer.

In the case where the amount of the crosslinking agent added is in the range, the multi-block copolymer constituting the polymer particles is crosslinked to provide crosslinked particles having an appropriate gel fraction. The crosslinked particles can be sufficiently expanded, and in the expansion, the cell wall forming the cells can sufficiently withstand the stretch caused by the expansion.

The crosslinking reaction is preferably performed at a temperature that is equal to or higher than the temperature, at which the multi-block copolymer of the polymer particles dispersed in the dispersing medium is softened, and the crosslinking agent is substantially decomposed, which is specifically the 1-hour half-life period temperature of the organic peroxide or more and the melting point of the polyethylene-based resin or more. The temperature may be retained for 1 to 200 minutes to perform the crosslinking.

(Expansion)

A blowing agent for expanding the crosslinked particles obtained through the crosslinking of the polymer particles is added to the dispersing medium in the closed vessel. The polymer particles or the crosslinked particles in a softened state are impregnated with the blowing agent. The temperature for the impregnation with the blowing agent is not particularly limited, as far as the temperature is equal to or higher than the temperature, at which the polymer particles or the crosslinked particles are in a softened state, and for example, the lower limit of the temperature for the impregnation with the blowing agent is preferably 100° C., more preferably 130° C., and further preferably 165° C. The upper limit of the temperature for the impregnation with the blowing agent is preferably 180° C., more preferably 170° C., and further preferably 165° C. The step of impregnation of the blowing agent may be performed before the crosslinking step, during the crosslinking step, or after the crosslinking step.

(Blowing Agent)

The blowing agent used is not particularly limited, as far as the blowing agent can expand the crosslinked particles. Examples of the blowing agent include an inorganic physical blowing agent, such as air, nitrogen, carbon dioxide, argon, helium, oxygen, and neon, and an organic physical blowing agent, such as an aliphatic hydrocarbon, e.g., propane, n-butane, isobutane, n-pentane, isopentane, and n-hexane, an alicyclic hydrocarbon, e.g., cyclohexane and cyclopentane, a halogenated hydrocarbon, e.g., chlorofluoromethane, trifluoromethane, 1,1-difluoroethane, 1,1,1,2-tetrafluoroethane, methyl chloride, ethyl chloride, and methylene chloride, and a dialkyl ether, e.g., dimethyl ether, diethyl ether, and methyl ethyl ether. Among these, an inorganic physical blowing agent is preferred since it does not deplete the ozone layer and is inexpensive, nitrogen, air, and carbon dioxide are more preferred, and carbon dioxide is particularly preferred. The blowing agents may be used alone or as a combination of two or more kinds thereof. The amount of the blowing agent mixed may be determined in consideration of the apparent density of the target expanded beads, the kind of the multi-block copolymer, the kind of the blowing agent, and the like, and is generally preferably from 2 to 20 parts by weight for the organic physical blowing agent and preferably from 0.5 to 20 parts by weight for the inorganic physical blowing agent, per 100 parts by weight of the multi-block copolymer. The crosslinking, impregnation, and expanding steps described above are preferably performed as a series of steps in the same closed vessel.

(Production of Expanded Beads)

The expandable crosslinked particles having been impregnated with the blowing agent and heated are discharged to an atmosphere having a pressure that is lower than the pressure in the closed vessel to thereby be expanded, so as to produce crosslinked expanded beads. Specifically, while retaining the pressure in the closed vessel to a pressure equal to or higher than the vapor pressure of the blowing agent, one end of the closed vessel under the water surface is opened, so as to discharge the expandable crosslinked particles containing the blowing agent along with the dispersing medium from the interior of the closed vessel to an atmosphere having a pressure that is lower than the pressure in the closed vessel, generally to the atmospheric pressure, thereby expanding the expandable crosslinked particles (which may be hereinafter referred to as direct expanding). The expanded beads can be produced in this manner. The production of the expanded beads by the aforementioned direct expanding method particularly facilitates the formation of a cell structure providing the ratio (c/b) of the average cell membrane thickness Tm (c) to the average surface layer thickness (b) that is from 0.3 to 0.8.

As the production method of the expanded beads, the method of producing in a closed vessel has been described above, but the production method of the expanded beads is not limited to the aforementioned production method. For example, such a method may be employed that the expandable crosslinked particles obtained through the processes (A) and (B) are taken out from the closed vessel, and dehydrated and dried, and then the expandable crosslinked particles are heated with a heating medium and expanded to form the crosslinked expanded beads. While the method of crosslinking the polymer particles with an organic peroxide has been described above, the crosslinking process in the present invention is not limited to the use of an organic peroxide, and other known methods may also be used, for example, the polymer particles or the expanded beads may be subjected to the crosslinking treatment by the electron beam crosslinking method or the like.

[Expanded Beads Molded Article]

The expanded beads molded article can be obtained by subjecting the expanded beads of the present invention to in-mold molding.

(In-Mold Molding)

The expanded beads molded article can be obtained by filling the expanded beads in a molding die, and heating with a heating medium, such as steam, for molding, according to a known method. Specifically, the expanded beads molded article having been shaped into the shape of the molding cavity can be obtained in such manner that the expanded beads are filled in a molding die, and then the expanded beads are heated and expanded by introducing a heating medium, such as steam, into the molding die, thereby fusion bonding the expanded beads. The in-mold molding in the present invention is preferably performed by a pressure molding method (see, for example, JP 51-22951 B), in which the expanded beads are subjected in advance to a pressure treatment with a pressurized gas, such as air, to increase the pressure inside the expanded beads for controlling the pressure inside the expanded beads to from 0.01 to 0.3 MPa (G) (G means the gauge pressure), then the expanded beads are filled in a cavity of a molding die under the atmospheric pressure or reduced pressure, followed by closing the die, and then a heating medium, such as steam, is introduced into the die for molding the expanded beads through fusion bonding thereof with heat. The expanded beads may also be molded by a compression filling molding method (see JP 4-46217 B), in which in a cavity pressurized with a compression gas to the atmospheric pressure or more, the expanded beads having been pressurized to the pressure or more are filled, and then a heating medium, such as steam, is introduced into the cavity to fusion bonding the expanded beads with heat. In addition, the expanded beads may be molded by an ordinary pressure filling molding method (see JP 6-49795 B), in which the expanded beads having a high secondary expanding force obtained by a special method are filled in a cavity of a pair of positive and negative dies under the atmospheric pressure or reduced pressure, and then a heating medium, such as steam, is introduced to fusion bonding the expanded beads with heat, the method combining the aforementioned methods (see JP 6-22919 B), or the like.

(Molded Article Density of Expanded Beads Molded Article)

The lower limit of the molded article density of the expanded beads molded article of the present invention may be preferably 40 g/L, more preferably 45 g/L, further preferably 50 g/L, and particularly preferably 55 g/L. The upper limit of the molded article density is preferably 300 g/L, more preferably 250 g/L, further preferably 200 g/L, and particularly preferably 150 g/L. In the case where the molded article density is in the range, the expanded beads molded article excellent in lightweight property, flexibility, repulsion, restorability, and tensile characteristics in a well balanced manner can be obtained. The molded article density (g/L) can be obtained by dividing the weight W (g) of the molded article by the volume V thereof (W/V).

(Fusion Bondability of Expanded Beads Molded Article)

The fusion bondability of the expanded beads molded article can be evaluated by a material fracture ratio obtained in such a manner that the molded article is fractured by bending, and the ratio of the expanded beads that undergo material failure with respect to the expanded beads that are exposed to the fracture surface is designated as the material fracture ratio. The material fracture ratio is preferably 80% or more, and more preferably 95% or more. The upper limit thereof is 100%. In the case where the fusion bondability is in the range, the expanded beads molded article may be excellent in properties, such as the maximum tensile strength and the tensile elongation, and can be utilized as a molded article suitable for purposes including a seat cushioning material, a pad material for sporting, a shoe sole material, and the like.

(Tensile Elongation of Expanded Beads Molded Article)

The expanded beads molded article of the present invention necessarily has a tensile elongation of 140% or more.

The tensile elongation of the expanded beads molded article can be obtained by measuring the distance between gauge lines at breakage in the tensile test described later. The tensile elongation is preferably 150% or more, and more preferably 160% or more.

The tensile elongation that is 140% or more suggests that the expanded beads molded article has excellent fusion bondability among the expanded beads, and can be applied to purposes including a seat cushioning material, a pad material for sporting, a shoe sole material, and the like, due to the excellent durability thereof. The upper limit of the tensile elongation may be approximately 500%.

The expanded beads obtained by the present invention has surfaces of the expanded beads that are readily fusion bonded to each other, thereby providing a molded article containing the expanded beads that are firmly fusion bonded to each other, i.e., a molded article having particularly enhanced tensile properties.

As described in detail above, according to the present invention, the expanded beads comprising a crosslinked multi-block copolymer containing a polyethylene block and an ethylene-α-olefin copolymer block, having an apparent density of 40 to 300 g/L and a gel fraction of 30 to 70% by weight by a hot xylene extraction method have the particular average cell diameter and the particular average surface layer thickness, and thereby the expanded beads are enhanced in fusion bondability and the in-mold moldability. Furthermore, the expanded beads molded article obtained through in-mold molding of the expanded beads of the present invention is an expanded beads molded article excellent in tensile characteristics since the expanded beads constituting the molded article are firmly fusion bonded to each other.

EXAMPLES

The present invention will be described with reference to examples below, but the present invention is not limited to the examples.

[Evaluation]

The expanded beads and the expanded beads molded articles used in Examples and Comparative Examples were evaluated as follows.

(Apparent Density of Expanded Beads)

The measurement was performed in the aforementioned measurement method.

(Average Cell Diameter of Expanded Beads)

The measurement was performed in the aforementioned measurement method for 30 expanded beads, and the arithmetic average value thereof was obtained.

(Average Surface Layer Thickness (b) of Expanded Beads)

The measurement was performed in the aforementioned measurement method for 30 expanded beads, and the arithmetic average value of the surface layer thicknesses of the expanded beads was obtained.

(Gel Fraction of Expanded Beads)

The measurement was performed by the aforementioned hot xylene extraction method.

(Flexural Modulus of Multi-Block Copolymer)

The flexural modulus of the multi-block copolymer was measured according to the measurement method described in JIS K7171:2008. In the measurement, a test piece of 80×10×4 mm was prepared and was subjected to three-point bending with a load cell of 10 kg under condition of a fulcrum distance of 64 mm and a bending rate of 2 mm/min. The flexural modulus was calculated based on the gradient in a range of displacement of 0.5 to 1.0 mm.

<Measurement and Evaluation Method of Tensile Elongation and Tensile Strength of Expanded Beads Molded Article>

(Maximum Tensile Strength and Tensile Elongation by Tension)

A cut piece was produced according to JIS K6767:1999 in such a manner that the expanded beads molded article was cut with a vertical slicer to a size of 120 mm×25 mm×10 mm with all the surfaces thereof being cut surfaces. Subsequently, a test piece was produced by cutting the cut piece into the No. 1 dumbbell form (having a measurement portion having a length of 40 mm, a width of 10 mm, and a thickness of 10 mm) with a jig saw. The test piece was subjected to a tensile test at a test speed of 500 mm/min, so as to measure the maximum tensile stress by tension and the elongation at breakage. The maximum tensile stress was designated as the tensile strength of the molded article. The tensile elongation of the expanded beads molded article was obtained in such a manner that the distance between gauge lines at breakage in the tensile test was measured, and the difference between the distance between gauge lines at breakage and the distance between gauge lines before the test is divided by the distance between gauge lines before the test, so as to provide the tensile elongation (%).

A range of the tensile strength of from 0.4 to 1 MPa was evaluated as a preferred range.

<Evaluation of Moldability>

In addition to an expanded beads molded article obtained by molding the expanded beads with a molding steam pressure of 0.20 MPa (G) as the standard, expanded beads molded articles were molded with variation of the molding steam pressure from the standpoint of the fusion bondability, the appearance (i.e., the extent of voids), and the restorability (i.e., the restorability from expansion or contraction after molding) of the molded article, and the moldability was evaluated by the following standard.

(Fusion Bondability)

The fusion bondability of the expanded beads molded article was evaluated by the following manner. The expanded beads molded article was fractured by bending, the number (C1) of the expanded beads present on the fracture surface and the number (C2) of the broken expanded beads were obtained, and the material fracture ratio was calculated from the ratio of the broken expanded beads with respect to the expanded beads present on the fracture surface (C2/C1×100). The aforementioned measurement was performed five times with different test pieces to provide the material fracture ratios thereof, and the fusion bondability was evaluated by the arithmetic average thereof.

A: material fracture ratio of 90% or more
B: material fracture ratio of 20% or more and less than 90%
C: material fracture ratio of less than 20%

(Appearance (Extent of Voids))

For the evaluation of the appearance, a region of 100 mm×100 mm was cut from the center portion of the expanded beads molded article to provide a test piece, a line was drawn from the corner of the test piece on the diagonal line thereof, and the number of voids having a size of 1 mm×1 mm or more on the line was counted and evaluated as follows.

A: number of voids of less than 5
B: number of voids of 5 or more and less than 10
C: number of voids of 10 or more (Restorability)

The expanded beads molded article corresponding to the dimension of the flat plate die having a length of 250 mm, a width of 200 mm, and a thickness of 20 mm used in the in-mold molding was measured for thickness at the edge portion (i.e., the position inside from the edge by 10 mm) and the center portion (i.e., the position equally dividing in both the longitudinal direction and the transverse direction). Subsequently, the thickness ratio of the expanded beads molded article ((thickness at center portion of the molded article)/(thickness at edge portion of the molded article)×100(%)) was calculated, and evaluated as follows.

A: thickness ratio of 95% or more
B: thickness ratio of 90% or more and less than 95%
C: thickness ratio of less than 90%

In the case where a molded article with good evaluation is obtained even though the molding steam pressure varies, the expanded beads can be determined as excellent expanded beads with a wide range of moldable condition. In the case where the molded article can be molded under a low molding pressure, the expanded beads can be determined as excellent expanded beads since the molding cycle is shortened to enhance the productivity.

Example 1

<Production of Particles of Multi-Block Copolymer>

To 100 parts by weight of an ethylene-α-olefin multi-block copolymer having a density of 887 g/L, a melting point of 120° C., a melt flow rate of 5.4 g/10 min (at 190° C. and a load of 2.16 kg), and a Shore A hardness of 86 containing a polyethylene block and an ethylene-α-olefin copolymer block (INFUSE 9530, produced by Dow Chemical Company, flexural modulus: 28 MPa), 1,000 ppm by weight of zinc borate (Zinc Borate 2335, produced by Tomita Pharmaceutical Co., Ltd., average particle diameter: 6 μm) as a cell controlling agent was added, and the mixture was placed in an extruder, melt-kneaded, extruded from a die having a diameter of 2 mm to a strand form, cooled in water, and cut for granulation with a pelletizer to a particle weight of approximately 5 mg, thereby providing particles of the multi-block copolymer (polymer particles).

<Production of Expanded Beads>

1 kg of the resulting polymer particles were mixed with 3 L of water as a dispersing medium, 3 g of kaolin as dispersant, 0.04 g of sodium alkylbenzene sulfonate, dicumyl peroxide as a crosslinking agent in an amount of 0.8 part by weight per 100 parts by weight of the multi-block copolymer, and the mixture was filled in a closed vessel having a capacity of 5 L along with 4 parts by weight of carbon dioxide (dry ice) as a blowing agent, heated to 160° C. as the crosslinking temperature and the expanding temperature under agitation, and after retaining for 30 minutes, discharged to the atmospheric pressure, thereby providing the expanded beads. The pressure of steam in the closed vessel was 2.5 MPa (G).

<Production of Expanded Beads Molded Article>

The resulting expanded beads were placed in a closed vessel, pressurized with compressed air of 0.2 MPa (G) for 12 hours to impart an internal pressure of 0.10 MPa (G) to the expanded beads, and after taking out from the vessel, subjected to in-mold molding in such a manner that the expanded beads were filled in a flat plate die having a length of 250 mm, a width of 200 mm, and a thickness of 20 mm, and after heating with steam at cracking of 20%, cooled and taken out from the die, and the resulting expanded beads molded article was dried and aged by heating in an oven adjusted to 60° C. for 12 hours, and taken out therefrom, thereby providing an expanded beads molded article. The resulting molded article was evaluated for the molded article density, the fusion bondability, the tensile strength, and the tensile elongation, and the results are shown in Table 1 along with the conditions.

Example 2

Expanded beads and an expanded beads molded article were produced in the same manner as in Example 1 except that in the production of the expanded beads, the amount of carbon dioxide was changed to 2.5 parts by weight to change the pressure of steam in expansion to 1.8 MPa (G).

Example 3

Expanded beads and an expanded beads molded article were produced in the same manner as in Example 1 except that in the production of the expanded beads, the amount of carbon dioxide was changed to 2 parts by weight to change the pressure of steam in expansion to 1.5 MPa (G).

Example 4

Expanded beads were produced by performing the same operation as in Example 1 except that the cell controlling agent was changed to powder of polytetrafluoroethylene (PTFE) (TFW-1000, a trade name, produced by Seishin Enterprise Co., Ltd., average particle diameter: 10 μm), and the amount of carbon dioxide was changed to 5 parts by weight to change the pressure of steam in expansion to 3.0 MPa (G), and an expanded beads molded article was obtained by molding the expanded beads under the condition shown in the table. The average surface layer thickness was decreased by changing the cell controlling agent.

Example 5

Expanded beads were produced by performing the same operation as in Example 1 except that the cell controlling agent was changed to talc, and the amount of carbon dioxide was changed to 5 parts by weight to change the pressure of steam in expansion to 3.0 MPa (G), and an expanded beads molded article was obtained by molding the expanded beads under the condition shown in Table 1.

Example 6

Expanded beads were produced by performing the same operation as in Example 1 except that the amount of zinc borate as the cell controlling agent was changed to 500 ppm by weight, and the amount of carbon dioxide was changed to 5 parts by weight to change the pressure of steam in expansion to 3.0 MPa (G), and an expanded beads molded article was obtained by molding the expanded beads under the condition shown in Table 1.

Example 7

Expanded beads were produced by performing the same operation as in Example 1 except that the amount of zinc borate as the cell controlling agent was changed to 200 ppm by weight, and the amount of carbon dioxide was changed to 5 parts by weight to change the pressure of steam in expansion to 3.0 MPa (G), and an expanded beads molded article was obtained by molding the expanded beads under the condition shown in Table 1.

Example 8

Expanded beads were produced by performing the same operation as in Example 1 except that the cell controlling agent was changed to PTFE (organic material powder), and the amount of PTFE was increased to 3,000 ppm by weight, and the amount of carbon dioxide was changed to 3 parts by weight to change the pressure of steam in expansion to 2.2 MPa (G), and an expanded beads molded article was obtained by molding the expanded beads under the condition shown in Table 1.

Comparative Example 1

Expanded beads were produced by performing the same operation as in Example 1 except that the amount of the blowing agent was decreased to 2 parts by weight to change the pressure of steam of the expansion condition to 1.4 MPa (G). The resulting expanded beads had a large thickness of the surface layer of the expanded beads, whereby the expanded beads were inferior in fusion bondability in molding, and the expanded beads molded article was deteriorated in tensile characteristics. In comparison to Example 8, the molded article density was equivalent thereto, but the value of the tensile elongation of the expanded beads molded article was decreased, from which it was confirmed that the resulting expanded beads molded article was inferior in tensile properties.

Comparative Example 2

Expanded beads were produced by performing the same operation as in Example 1 except that the cell controlling agent was not used, and the amount of carbon dioxide was changed to 5 parts by weight to change the pressure of steam of the expansion condition to 3.0 MPa (G). The resulting expanded beads were inferior in fusion bondability due to the too large cell diameter, and the expanded beads molded article was deteriorated in tensile characteristics. In comparison to Example 3, the molded article density was 120 g/L as equivalent thereto, but the value of the tensile elongation of the expanded beads molded article was decreased, from which it was confirmed that the resulting expanded beads molded article was inferior in tensile properties.

TABLE 1

|  |  |  | Example 1 | Example 2 | Example 3 | Example 4 | Example 5 | Example 6 |
|---|---|---|---|---|---|---|---|---|
| Crosslinked resin particles | Resin |  | INFUSE 9530 | INFUSE 9530 | INFUSE 9530 | INFUSE 9530 | INFUSE 9530 | INFUSE 9530 |
|  | Cell controlling agent |  | ZnB | ZnB | ZnB | PTFE | talc | ZnB |
|  | Amount added | ppm by weight | 1000 | 1000 | 1000 | 1000 | 1000 | 500 |
| Expansion condition | Amount of blowing agent | part by weight | 4 | 2.5 | 2 | 5 | 5 | 5 |
|  | Impregnation temperature | °C. | 110 | 110 | 110 | 110 | 110 | 110 |
|  | Crosslinking temperature | °C. | 160 | 160 | 160 | 160 | 160 | 160 |
|  | Retention time | min | 30 | 30 | 30 | 30 | 30 | 30 |
|  | Expanding temperature | °C. | 160 | 160 | 160 | 160 | 160 | 160 |
|  | Pressure of steam | MPa(G) | 2.5 | 1.8 | 1.5 | 3.0 | 3.0 | 3.0 |
| Expanded beads | Apparent density | g/L | 101 | 131 | 154 | 133 | 138 | 126 |
|  | Average surface layer thickness (b) | μm | 9 | 11 | 18 | 10 | 9 | 13 |
|  | Average cell diameter (a) | μm | 90 | 98 | 105 | 83 | 76 | 118 |
|  | a/b |  | 10.0 | 8.9 | 5.8 | 8.3 | 8.4 | 9.1 |
|  | Average cell membrane thickness (c) | μm | 3.7 | 5.4 | 7.0 | 4.7 | 4.5 | 6.3 |
|  | c/b |  | 0.42 | 0.49 | 0.39 | 0.47 | 0.50 | 0.48 |
|  | Gel fraction | % by weight | 55 | 50 | 52 | 53 | 54 | 51 |
| Molding condition | Internal pressure | MPa(G) | 0.10 | 0.10 | 0.10 | 0.10 | 0.10 | 0.10 |
|  | Cracking | % | 20 | 20 | 20 | 20 | 20 | 20 |
|  | Molding pressure | MPa(G) | 0.20 | 0.20 | 0.20 | 0.20 | 0.20 | 0.20 |
| Expanded beads molded article | Molded article density | g/L | 78 | 98 | 121 | 89 | 95 | 83 |
|  | Tensile strength | MPa | 0.42 | 0.47 | 0.55 | 0.46 | 0.45 | 0.42 |
|  | Tensile elongation | % | 202 | 185 | 165 | 213 | 160 | 167 |
| Evaluation of moldability | Molding pressure 0.16 MPa(G) | Fusion bondability | A | A | B | A | A | C |
|  |  | Appearance (voids) | A | A | B | A | A | C |
|  |  | Restorability | A | A | A | A | A | A |
|  | Molding pressure 0.18 MPa(G) | Fusion bondability | A | A | A | A | A | B |

TABLE 1-continued

|  |  |  |  |  |  |  |  |  |
|---|---|---|---|---|---|---|---|---|
| Molding pressure 0.20 MPa(G) | Appearance (voids) | A | A | A | A | A | B |
|  | Restorability | A | A | A | A | A | A |
|  | Fusion bondability | A | A | A | A | A | A |
|  | Appearance (voids) | A | A | A | A | A | A |
|  | Restorability | A | A | A | A | A | A |
| Molding pressure 0.22 MPa(G) | Fusion bondability | A | A | A | A | A | A |
|  | Appearance (voids) | A | A | A | A | A | A |
|  | Restorability | C | B | A | C | B | C |

| | | | Example 7 | Example 8 | Comparative Example 1 | Comparative Example 2 |
|---|---|---|---|---|---|---|
| Crosslinked resin particles | Resin | | INFUSE 9530 | INFUSE 9530 | INFUSE 9530 | INFUSE 9530 |
|  | Cell controlling agent | | ZnB | PTFE | ZnB | none |
|  | Amount added | ppm by weight | 200 | 3000 | 1000 | none |
| Expansion condition | Amount of blowing agent | part by weight | 5 | 3 | 2 | 5 |
|  | Impregnation temperature | ° C. | 110 | 110 | 110 | 110 |
|  | Crosslinking temperature | ° C. | 160 | 160 | 160 | 160 |
|  | Retention time | min | 30 | 30 | 30 | 30 |
|  | Expanding temperature | ° C. | 160 | 160 | 160 | 160 |
|  | Pressure of steam | MPa(G) | 3.0 | 2.2 | 1.4 | 3.0 |
| Expanded beads | Apparent density | g/L | 151 | 215 | 204 | 168 |
|  | Average surface layer thickness (b) | μm | 19 | 21 | 28 | 25 |
|  | Average cell diameter (a) | μm | 152 | 138 | 113 | 190 |
|  | a/b | | 8.0 | 6.6 | 4.0 | 7.6 |
|  | Average cell membrane thickness (c) | μm | 9.9 | 13.6 | 10.4 | 14.0 |
|  | c/b | | 0.52 | 0.65 | 0.37 | 0.56 |
|  | Gel fraction | % by weight | 49 | 50 | 54 | 52 |
| Molding condition | Internal pressure | MPa(G) | 0.10 | 0.10 | 0.10 | 0.10 |
|  | Cracking | % | 20 | 20 | 20 | 20 |
|  | Molding pressure | MPa(G) | 0.20 | 0.20 | 0.20 | 0.2 |
| Expanded beads molded article | Molded article density | g/L | 100 | 166 | 158 | 120 |
|  | Tensile strength | MPa | 0.48 | 0.64 | 0.47 | 0.42 |
|  | Tensile elongation | % | 201 | 171 | 114 | 137 |
| Evaluation of moldability | Molding pressure 0.16 MPa(G) | Fusion bondability | C | C | C | C |
|  |  | Appearance (voids) | C | B | C | C |
|  |  | Restorability | A | A | A | A |
|  | Molding pressure 0.18 MPa(G) | Fusion bondability | B | B | C | C |
|  |  | Appearance (voids) | B | A | C | C |
|  |  | Restorability | A | A | A | A |
|  | Molding pressure 0.20 MPa(G) | Fusion bondability | A | A | B | B |
|  |  | Appearance (voids) | A | A | C | B |
|  |  | Restorability | A | A | A | A |
|  | Molding pressure 0.22 MPa(G) | Fusion bondability | A | A | B | A |
|  |  | Appearance (voids) | A | A | C | B |
|  |  | Restorability | B | A | A | B |

INDUSTRIAL APPLICABILITY

The expanded beads of the present invention are excellent in moldability, and an expanded beads molded article obtained by using the expanded beads provides an expanded beads molded article excellent in tensile characteristics, and can be favorably utilized as a seat cushioning material, a pad material for sporting, a shoe sole material, and the like.

The invention claimed is:

1. An expanded beads molded article, which is produced through in-mold molding of expanded beads comprising a crosslinked multi-block copolymer containing a polyethylene block and an ethylene-α-olefin copolymer block, wherein the flexural modulus of the multi-block copolymer is from 10 to 50 MPa, wherein the expanded beads have an apparent density of 40 to 300 g/L, a gel fraction of 30 to 55% by weight by a hot xylene extraction method, an average cell diameter (a) of 50 to 180 μm, and an average surface layer thickness (b) of 3 to 27 μm, and wherein a ratio (a/b) of the average cell diameter (a) to the average surface layer thickness (b) is from 5 to 12, wherein a ratio (c/b) of an average cell membrane thickness (c) of the expanded beads to the average surface layer thickness (b) is from 0.35 to 0.8, and wherein the expanded beads molded article has a tensile elongation of 140% or more.

2. The expanded beads molded article according to claim 1, wherein the multi-block copolymer is a multi-block copolymer containing a polyethylene block and an ethylene-octene copolymer block.

3. The expanded beads molded article according to claim 1, wherein an average bead diameter of the expanded beads is from 0.5 to 10 mm.

4. The expanded beads molded article according to claim 1, wherein a density of the multi-block copolymer is from 700 to 900 g/L.

5. The expanded beads molded article according to claim 1, wherein a melt flow rate at 190° C. and a load of 2.16 kg of the multi-block copolymer is from 2 to 10 g/10 min.

6. The expanded beads molded article according to claim 1, wherein a cell controlling agent is contained in the expanded beads.

* * * * *